United States Patent
Mizuno et al.

(10) Patent No.: US 9,941,559 B2
(45) Date of Patent: *Apr. 10, 2018

(54) WATER ENHANCED IONIC LIQUID ELECTROLYTES FOR METAL-AIR BATTERIES

(71) Applicant: Toyota Motor Engineering & Manufacturing North America, Inc., Erlanger, KY (US)

(72) Inventors: Fuminori Mizuno, Ann Arbor, MI (US); Kensuke Takechi, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 609 days.

This patent is subject to a terminal disclaimer.

(21) Appl. No.: 14/538,290

(22) Filed: Nov. 11, 2014

(65) Prior Publication Data

US 2016/0134002 A1    May 12, 2016

(51) Int. Cl.
| | |
|---|---|
| H01M 12/08 | (2006.01) |
| H01M 12/02 | (2006.01) |
| H01M 4/86 | (2006.01) |
| H01M 4/38 | (2006.01) |
| H01M 4/90 | (2006.01) |
| H01M 4/92 | (2006.01) |

(52) U.S. Cl.
CPC ......... *H01M 12/08* (2013.01); *H01M 4/8605* (2013.01); *H01M 12/02* (2013.01); *H01M 4/382* (2013.01); *H01M 4/90* (2013.01); *H01M 4/92* (2013.01); *H01M 2300/0068* (2013.01); *Y02E 60/128* (2013.01)

(58) Field of Classification Search
CPC ........ H01M 12/02; H01M 12/08; H01M 4/90; H01M 4/92; H01M 4/382; H01M 4/8605
See application file for complete search history.

(56) References Cited

U.S. PATENT DOCUMENTS

| | | | |
|---|---|---|---|
| 4,377,623 A | 3/1983 | Parker et al. | |
| 6,797,437 B2 | 9/2004 | Tsukamoto et al. | |
| 7,167,353 B2 * | 1/2007 | Yuyama | B01D 17/06 252/62.2 |
| 8,722,227 B2 | 5/2014 | Chiang et al. | |
| 2011/0305959 A1 | 12/2011 | Friesen et al. | |
| 2013/0034781 A1 | 2/2013 | Khasin | |
| 2013/0187618 A1 * | 7/2013 | Suppes | H01M 2/38 320/137 |

(Continued)

OTHER PUBLICATIONS

U.S. Appl. No. 14/533,286, filed Nov. 5, 2014, Mizuno, et al.

(Continued)

*Primary Examiner* — Osei K Amponsah

(74) *Attorney, Agent, or Firm* — Oblon, McClelland, Maier & Neustadt, L.L.P.

(57) ABSTRACT

A metal-air battery comprising an emulsified or dispersed aqueous/ionic liquid two phase electrolyte system is provided. The two phase electrolyte system contains an aqueous phase and an ionic liquid phase wherein an amount of water exceeds the aqueous solubility of the ionic liquid. In one embodiment the metal-air battery is a lithium-air battery.

22 Claims, 7 Drawing Sheets

11 : Anode
12 : Separator
13 : Biphase electrolyte
14 : Cathode
15 : Ultra bath sonicator
16 : Inlet
17 : Outlet
18 : Biphase electrolyte tank (No housing case in Figure)

(56) References Cited

U.S. PATENT DOCUMENTS

2013/0202974 A1* 8/2013 Mizuno .................. H01M 4/86
429/405
2014/0125292 A1 5/2014 Best et al.

OTHER PUBLICATIONS

Stefano Meini, et al. "The Effect of Water on the Discharge Capacity of a Non-Catalyzed Carbon Cathode for Li—$O_2$ Batteries" *Electrochemical and Solid-State Letters*, 15 (4) A45-A48 (2012).

Xiao-Zi Yuan, et al. "Oxygen Reduction Reaction in 1-Butyl-1-methyl-pyrrolidinium Bis(trifluoromethanesulfonyl)imide: Addition of Water as a Proton Species", *Journal of The Electrochemical Society*, 161 (4) A451-A457 (2014).

Tao Zhang, et al. "A Novel High Energy Density Rechargeable lithium/air Battery", Received (in Cabridge, U.K) Sep. 30, 2009, Accepted Jan. 22, 2010.

* cited by examiner

11 : Anode
12 : Separator
13 : Biphase electrolyte
14 : Cathode
15 : Ultra bath sonicator (No housing case in Figure)

WATER ENHANCED IONIC LIQUID ELECTROLYTES FOR METAL-AIR BATTERIES

BACKGROUND OF THE INVENTION

The present invention is directed to an electrolyte system for a metal-air battery having high capacity and recycle efficiency.

Lithium ion technology has dominated the market as energy source for small electronic devices and even hybrid electric vehicles. However, Li-ion batteries have insufficient theoretical capacity to be a power source for future high capacity generations of power sources capable to run an electric vehicle.

Metal-air batteries have been under investigation as advanced generation of high capacity energy sources that have the potential to power vehicular devices for distances comparable to present hydrocarbon based combustion engines. In a metal-air battery, the metal of the anode is oxidized and the resulting cation travels to the cathode zone containing a porous matrix of a material such as carbon, for example, where oxygen is reduced and the reduction product as oxide or peroxide combines with the metal cation to form the discharge product. Upon charge, this process is ideally reversed. Metal-air batteries are recognized to have potential advantageous properties over metal ion batteries because the cathodic material, oxygen, may be obtained from the environmental air atmosphere and thus the capacity of the battery would in theory be limited by the anodic metal supply. Thus, oxygen gas would be supplied continuously from outside the battery and battery capacity and voltage would be dependent upon the oxygen reducing properties and chemical nature of the discharge product formed.

Metal-air batteries typically include a metal electrode at which a metal is oxidized, an air electrode at which oxygen is reduced, and an electrolyte for providing ion conductivity. A significant limiting factor with conventional metal-air batteries is the evaporation of the electrolyte solution (i.e., the ionically conductive medium), particularly the evaporation of the solvent, such as water in an aqueous electrolyte solution and organic solvent in a non-aqueous electrolyte solution. Because the air electrode is required to be air permeable to absorb oxygen, it also may permit the solvent vapor to escape from the cell. Over time, the cell's operation efficiency is reduced due to solvent depletion.

Other problems associated with aqueous electrolyte batteries include water electrolysis during recharging and self-discharge. During recharge, a current is passed through the battery to reduce the oxidized fuel at the fuel electrode. Some of the current, however, electrolyzes the water resulting in hydrogen evolution (reduction) at the fuel electrode and oxygen evolution (oxidation) at the oxygen electrode as represented in the following equations:

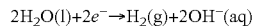  Reduction:

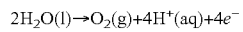  Oxidation:

In this manner, further aqueous electrolyte is lost from the battery. Additionally, the electrons that are consumed in reducing hydrogen are not available to reduce the oxide. Therefore, the parasitic electrolysis of the aqueous electrolyte reduces the long term cycle efficiency of the secondary battery.

To compensate for these problems, metal-air batteries with aqueous electrolyte solutions are typically designed to contain a relatively high volume of electrolyte solution. Some cell designs even incorporate means for replenishing the electrolyte from an adjacent reservoir to maintain the electrolyte level. However, either approach adds to both the overall size of the cell, as well as the weight of the cell, without enhancing the cell performance (except to ensure that there is a significant volume of electrolyte solution to offset evaporation of the water or other solvent over time). Specifically, the cell performance is generally determined by the fuel characteristics, the electrode characteristics, the electrolyte characteristics, and the amount of electrode surface area available for reactions to take place. But the volume of electrolyte solution in the cell generally does not have a significant beneficial effect on cell performance, and thus generally only detracts from cell performance in terms of volumetric and weight based ratios (power to volume or weight, and energy to volume or weight). Also, an excessive volume of electrolyte may create a higher amount of spacing between the electrodes, which may increase ohmic resistance and detract from performance.

Metals employed as oxidizable anode materials include any metal, alloy or metal hydrides thereof. For example, the fuel may comprise transition metals, alkali metal, and alkaline earth metals. Transition metals include, but are not limited to, zinc, iron, manganese, and vanadium. The most common alkali metal is lithium but other alkali metals including sodium may be used. The other metals include, but are not limited to magnesium, aluminum, calcium and gallium. The metal electrode may comprise a metal, including elemental metal, metal bonded in a molecule or complex, including oxides, metal alloys, metal hydrides, etc.

The metal electrode may have any construction or configuration and may be a porous structure with a three-dimensional network of pores, a mesh screen, a plurality of mesh screens isolated from one another, or any other suitable electrode. The fuel electrode includes a current collector, which may be a separate element, or the body on which the fuel is received may be electroconductive and thus also be the current collector.

Lithium air batteries have the potential to supply 5-10 times greater energy density than conventional lithium ion batteries and have attracted much interest and development attention as a post lithium ion battery technology. For example, a nonaqueous lithium air battery which forms $Li_2O_2$ as discharge product theoretically would provide 3038 Wh/kg in comparison to 600 Wh/kg for a lithium ion battery having a cathodic product of $Li_{0.5}CoO_2$. However, in practice, the metal air technology in general and specifically current nonaqueous lithium air batteries suffer many technical problems which have prevented achievement of the theoretical capacity.

The capacity of the Li air battery is highly dependent upon the capacity of the cathode matrix to store the $Li_2O_2$ discharge product. $Li_2O_2$ is generally insoluble in conventional nonaqueous solvents employed in metal air batteries. Therefore, upon formation at the cathode matrix the $Li_2O_2$ precipitates and fills the surface porosity of the matrix thus preventing access to the vacant capacity of the matrix interior region. Moreover, $Li_2O_2$ is an insulator and therefore, once the surface of the matrix is coated, oxygen reduction is prevented and discharge terminated, i.e., the capacity of the battery is severely reduced in comparison to the theoretical capacity.

Furthermore, the cathode performance is strongly affected by the moisture content of ambient air. To simplify the cathode reaction mechanism, much effort has been devoted to battery systems having a supply of pure oxygen to the cathode. However, practically speaking, the structure, cost and equipment necessary for such a system detracts from the potential advantages. To be of utmost utility the metal air battery will require utility of ambient air.

In non-aqueous Li-air battery, water is detrimental to battery performance as described above. To date in spite of much experimental effort and study, no practically feasible method to develop a metal-air battery that functions efficiently with ambient air as oxygen source has been developed. One consideration may be to dry the ambient air in advance before introduction into the battery. However, in order to decrease the water content of air to an acceptable level (less than hundreds ppm), the dehydration system required would be too large. This will be also unrealistic for the installment of Li-air battery.

In view of the problems associated with non-aqueous electrolyte metal-air batteries, selecting an aqueous Li-air battery system may be considered. However, in an aqueous system, a highly concentrated alkaline solution is formed about the cathode which is corrosive to surrounding materials of construction. Also, in an aqueous system, water functions both as an electrolyte solvent and an active material. As a consequence the water content of the system is depleted during operation of the battery and requires a certain level of humidity in the environmental air supply to remain functional. However, this is not feasible for batteries operating in an environment of elevated or freezing temperatures. Thus water management is an element which is key to success of the aqueous Li-air battery.

The purpose of this invention is to develop new electrolyte solvents containing water that may have general utility for metal-air batteries and specifically for Li-air batteries. This novel electrolyte will be suitable for utility as a non-aqueous electrolyte solvent as well as aqueous electrolyte solvent.

Effort to overcome the problems listed above for metal-air batteries and to produce an efficient high capacity metal-air battery has received much attention.

Best et al. (U.S. 2014/0125292) describes lithium ion or lithium metal batteries containing electrolyte systems containing ionic liquids which are based on an anion containing a nitrile group. Dicyanamide is exemplary of an anion of this type. A water content of less than 1000 ppm in the ionic liquid is described as allowable. However, lower levels, "less than 750 ppm, less than 500, less than 250 ppm, . . . " are describes as preferred embodiments. Best does not describe a lithium air battery, does not describe a two phase aqueous/ionic liquid composition and does not disclose or suggest input of energy to a two phase liquid electrolyte system to form a dispersion or emulsion. It is believed that the water levels described in this reference are dissolved amounts and therefore a single phase electrolyte solvent is disclosed.

Khasin (U.S. 2013/0034781) describes a metal air battery having an aqueous electrolyte system. In a main embodiment, the battery is an aluminum-air battery. To avoid or control formation of metal oxide gel in the electrolyte, Khasin adds small particulates that prevent gel formation or with mechanical energy input, break the gel formed. The mechanical energy is applied by a sonicator that supplies ultrasonic vibration. Khasin does not disclose or suggest an ionic liquid as an electrolyte component and does not suggest an electrolyte having a two phase structure of ionic liquid and water.

Chiang et al. (U.S. Pat. No. 8,722,227) describes a redox flow energy device (flow cell) containing. Both lithium and sodium flow batteries are described as exemplary devices. Chiang describes application of "acoustic energy" the electrolyte flow system to prevent build-up of particles which would inhibit electrochemical performance. The carrier liquid may be aqueous or non-aqueous and ionic liquids are included in a listing of potential non-aqueous electrolyte solvents. A mixing fluid, not miscible with the electrolyte may be admitted to the flow cell to provide good mixing of the flowing redox composition. Chiang does not disclose or suggest a metal-air battery and does not disclose or suggest an electrolyte being a two phase aqueous-ionic liquid mixture.

Tsukamoto et al. (U.S. Pat. No. 6,797,437) describes a lithium ion secondary battery having an anode of lithium metal or porous material capable of absorbing and releasing lithium ions and a cathode of a complex oxide of lithium and a transition metal. The electrolyte is a soluble lithium salt in a two phase electrolyte system containing a carbonate and/or ether combination. The second phase is formed by a halogen containing flame retardant material. Tsukamoto is not concerned with intimate mixing of the two phases and describes having two distinct phases as advantageous because the halogen material does not interfere with the redox chemistry of the battery. Tsukamoto does not disclose an ionic liquid as an electrolyte component and does not disclose or suggest a two phase electrolyte having aqueous and ionic liquid phases. Further, Tsukamoto does not describe a metal-air battery.

Parker et al. (U.S. Pat. No. 4,377,623) describes a zinc-halogen electrochemical cell having inert electrodes which support oxidation of zinc metal added to the cell and bromine added to the cell. The electrolyte liquid is a two phase combination of an aqueous phase containing halide ions and an organic nitrile phase containing halogen. The performance of the system requires the formation of two distinct phases as layers and intimate mixing would not be operable. Parker is not directed to a metal-air battery and does not disclose or suggest an ionic liquid as an electrolyte solvent.

Yuan et al. (Journal of the Electrochemical Society, 161 (4) A451-A457 (2014)) describes a study of the electrochemical performance of cells containing room temperature ionic liquids (RTIL) with as much as 1.0% water. The solubility of water in the same RTIL (1-butyl-1-methyl-pyrrilidinium bis(trifluoromethanesulfonyl)imide) (BMP-TFSI) was shown to be 1.1407 wt % and therefore, a two phase system is not disclosed. Mixtures of 0.25 to 1.0 wt. % water in 1-butyl-1-methyl-pyrrolidinum bis(trifluoromethanesulfonyl)imide are prepared by ultrasonic mixing. However, these mixtures were prepared for conductivity and electrochemical characterization. Yuan does not disclose or suggest a metal-air battery with a two phase aqueous/ionic liquid electrolyte intimately mixed by an ultrasonic treatment.

Gasteiger et al. (Electrochemical and Solid State Letters, 15 (4) A45-A48 (2012)) describes a study of the effect $CO_2$ and water on the performance of a lithium-air battery. The study showed that small amounts of water enhance capacity of the cell. Ionic liquids and/or a two phase aqueous/ionic liquid system is not disclosed or suggested.

Zhang et al. (Chem. Commun., 2010, 46, 1661-1663) describes a lithium air battery employing an electrolyte system composition of acetic acid/water and lithium acetate. The lithium acetate is also indicated to be formed by oxidation of the lithium metal anode. Construction of a lithium-air electrochemical cell (Li/PEO$_{18}$LiTFSI/LTAP/HOAc—H$_2$O—LiOAc/Pt-carbon black) is described and an energy density estimated to be 1.478 W h/kg. Zhang does not disclose or suggest an ionic liquid as an electrolyte component or a two phase (aqueous/ionic liquid) electrolyte system.

Friesen et al. (U.S. 2011/0305959) describes a metal-air battery having an ionic liquid based electrolyte. Metals suitable as anode materials include transition metals, alkali metals and alkali earth metals. Zinc air systems are most fully described. Friesen discusses the necessity to maintain a sufficient level of water in the electrolyte composition to drive the charge and discharge process and "tunes the ionic liquid" to contains water from 0.001 to 25% by adding a hydrophilic or hygroscopic additive which effectively absorbs water into the electrolyte. The amount of water absorbed depends on the nature and amount of the additive. Examples given for a zinc-air system include zinc chloride, zinc tetrafluoroborate zinc acetate and $Zn(TFSI)_2$. Although Friesen discloses as much as 25% water, a 2 phase ionic liquid electrolyte system is never explicitly disclosed or suggested. Likewise, sonication to disperse water into the ionic liquid is neither disclosed nor suggested.

In spite of the significant ongoing effort there remains a need to develop and produce an effective electrolyte system for a high capacity metal-air battery useful especially for powering vehicles to distances at least equal to or competitive with current hydrocarbon fuel systems.

SUMMARY OF THE INVENTION

This and other objects are addressed by the present invention, the first embodiment of which includes a metal-air battery, comprising: an anode compartment; a cathode compartment supplied with an $O_2$ source; and a metal ion conductive membrane separating the anode compartment from the cathode compartment; wherein the anode compartment comprises an anode having a transition metal, alkali metal or alkaline earth metal as an active component and an electrolyte salt of the anode active component, the cathode compartment comprises an air electrode and an emulsion or dispersion of an aqueous phase in an ionic liquid.

In an aspect of the first embodiment the metal of the anode comprises a metal selected from the group consisting of a transition metal, an alkali metal and an alkaline earth metal.

In a specific embodiment, the present invention provides a lithium-air battery, comprising: an anode compartment; a cathode compartment supplied with an $O_2$ source; and a lithium ion conductive membrane separating the anode compartment from the cathode compartment; wherein the anode compartment comprises an anode having lithium metal or a lithium alloy as an active component, the cathode compartment comprises an air electrode and an emulsion or dispersion of an aqueous phase in an ionic liquid.

In a specific aspect of the present invention, the emulsion or dispersion of the aqueous phase in the ionic liquid is obtained by ultrasound treatment of a two phase system containing water and an ionic liquid wherein the amount of water exceeds the water solubility of the ionic liquid.

In a further embodiment, the present invention includes a metal-air battery either directly equipped with a sonicator at the cathode compartment or equipped with a system which prepares an aqueous emulsion or dispersion in an ionic liquid by treatment of the two phase system with ultrasound treatment and provides the emulsion or dispersion to the cathode compartment.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS OF THE INVENTION

Figure 1:
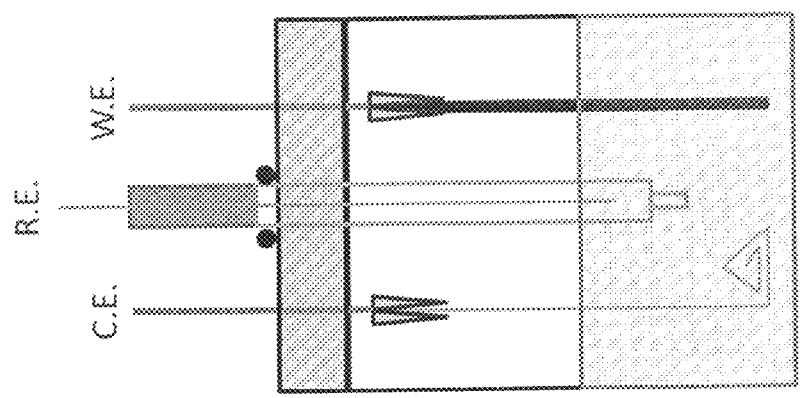
FIG. 1 shows a schematic structure of an electrochemical cell for cyclic voltammetry analysis of the electrolyte systems.

Throughout this description all ranges described include all values and sub-ranges therein, unless otherwise specified. Additionally, the indefinite article "a" or "an" carries the meaning of "one or more" unless otherwise specified.

According to the present invention the term "vehicle" means any power driven device designed for transportation including an automobile, truck van, bus, golf cart and other utility forms of transportation. In reference to battery structure the terms "compartment" and "room" are used interchangeably and describe a portion of the battery bordered and defined by the battery separator.

Throughout this description, the terms air, oxygen and $O_2$ as cathode material may be used interchangeably unless specifically limited. One of ordinary skill will understand that $O_2$ is the redox active cathode ingredient and whether described as air, oxygen or $O_2$, the meaning is understood. In certain description air of pure $O_2$ may be described as the source of the cathode ingredient.

The present inventors are conducting a broad and detailed study of post-lithium ion battery technologies seeking to identify and develop new and improved energy supply systems having capacity and voltage suited to specific uses. Metal-air batteries having high capacity and high working potential are ongoing targets of such study and in this ongoing study the inventors have discovered a new and novel two phase electrolyte system which addresses and overcomes many of the problems associated with conventionally known electrolytes employed with metal-air batteries and especially lithium-air batteries.

As disclosed in U.S. patent application Ser. No. 14/533,286, filed Nov. 5, 2014, the inventors have discovered that a two phase electrolyte system containing an aqueous phase and a room temperature ionic liquid (RTIL) provides a unique and novel mechanism to form a metal-air battery wherein water management is possible. Unlike previously reported ionic liquid systems containing dissolved moisture to the extent of water solubility of the ionic liquid, the inventors learned that a system of an ionic liquid and water in excess of the aqueous solubility of the RTIL in the form of a two phase system may be an effective electrolyte for a metal-air battery and especially for a lithium-air battery.

In continued study of the two phase aqueous/ionic liquid system, the inventors have learned that water present in the ionic liquid phase is depleted during battery performance and a method to maintain consistent water content of the ionic phase would lead to enhanced system performance. Thus, the inventors have unexpectedly discovered that ultrasonic treatment of a two phase system of an aqueous phase and ionic liquid phase where the water content exceeds the water solubility of the ionic liquid leads to formation of an ionic liquid phase having a highly dispersed or emulsified water content which is greater than the solubility level is obtained. Separation of this phase from the aqueous layer provides an effective and improved performance electrolyte system for a metal-air battery.

Thus in a first embodiment, the present invention provides a metal-air battery, comprising: an anode compartment; a cathode compartment supplied with an $O_2$ source; and a metal ion conductive membrane separating the anode compartment from the cathode compartment; wherein the anode compartment comprises an anode having a transition metal, alkali metal or alkaline earth metal as an active component, and the cathode compartment comprises an air electrode and an emulsion or dispersion of an aqueous phase in an ionic liquid.

In a more specific embodiment the present invention provides a lithium-air battery, comprising: an anode compartment; a cathode compartment supplied with an $O_2$ source; and a lithium ion conductive membrane separating the anode compartment from the cathode compartment; wherein the anode compartment comprises an anode having lithium metal or a lithium alloy as an active component, the cathode compartment comprises an air electrode and an emulsion or dispersion of an aqueous phase in an ionic liquid.

In preferred aspects of these embodiments, the $O_2$ source is air.

As described in the Examples (see FIGS. 2 and 4), lithium-air batteries prepared with the emulsified or dispersed aqueous/ionic liquid system have higher working potential and thus have the potential for producing batteries of higher energy density than batteries containing ionic liquid electrolyte with only dissolved water at a level of solubility in the ionic liquid.

However, the inventors have learned that the emulsified or dispersed two phase aqueous/ionic liquid system remains in the emulsified or dispersed state for a limited lifetime and therefore, renewal of the dispersion or emulsion is necessary for long term battery performance.

Therefore, the present invention provides various embodiments for battery structure having a cathode compartment containing an aqueous/ionic liquid emulsion or dispersion for long term performance.

Figure 5:
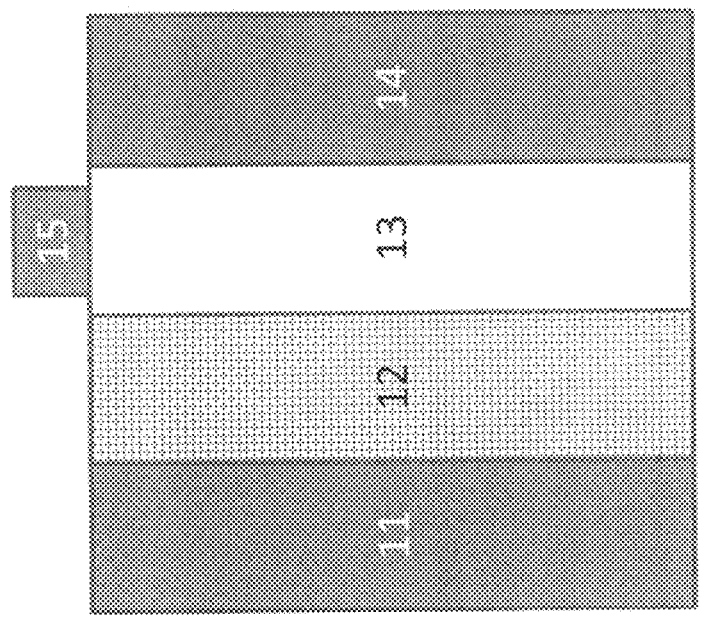
FIG. 5 shows a schematic structure of a metal-air battery equipped with an ultrasonic bath sonicator to create a sonicated biphase electrolyte solution.

In one embodiment as shown in FIG. 5, a sonicator device is directly incorporated or attached to the cathode compartment such that ultrasonic energy may be applied continuously, periodically or intermittently to the emulsion or dispersion.

Figure 6:
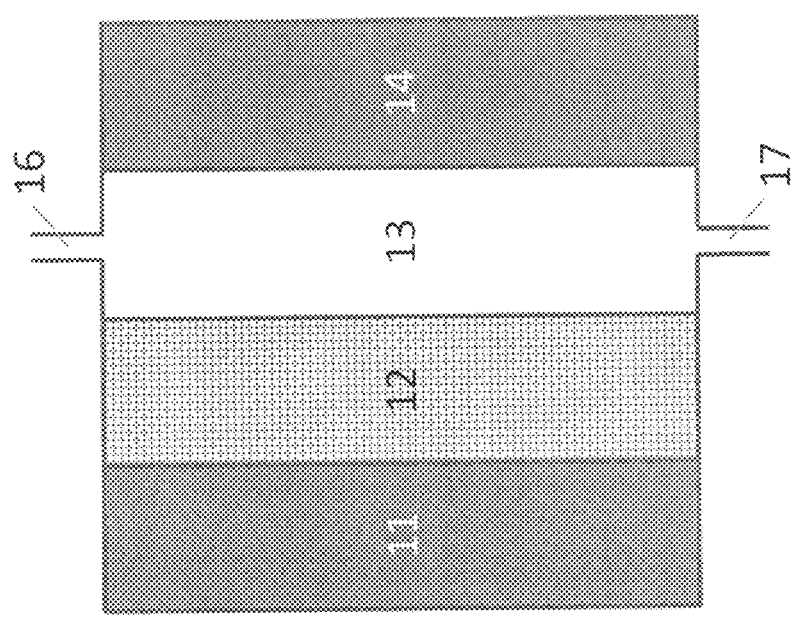
FIG. 6 shows a schematic structure of a metal-air battery equipped with an electrolyte exchanging system to replace used electrolyte solution with newly sonicated biphase electrolyte emulsion or dispersion.

In another embodiment, as shown in FIG. 6, the cathode compartment is constructed as a flow-through cell wherein sonicated biphasic electrolyte liquid can be continuously, periodically or intermittently added to the cathode compartment from an outside reservoir (not shown) and displaced biphasic electrolyte emulsion or dispersion returned to the reservoir for ultrasonic re-emulsion or dispersion.

Figure 7:
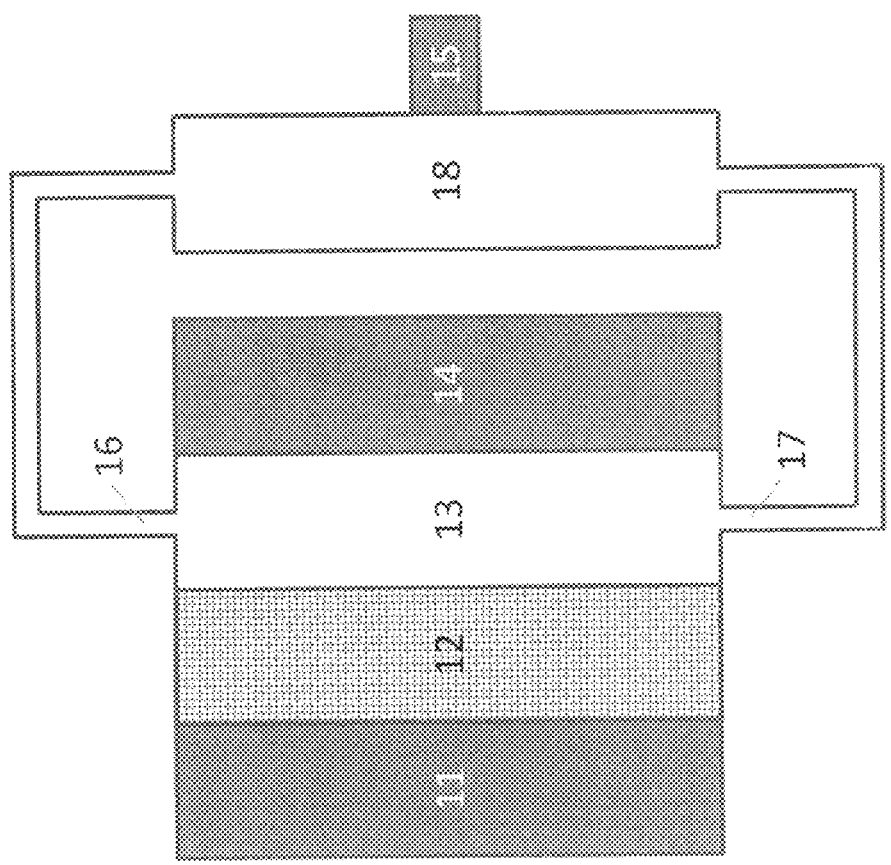
FIG. 7 shows a schematic structure of a metal-air battery equipped with an electrolyte flow system to supply newly sonicated biphase electrolyte dispersion or emulsion.

In still another embodiment as shown in FIG. 7, a battery is constructed to include as a structural component, a reservoir or tank equipped with a sonicator and the aqueous/ionic liquid electrolyte emulsion or dispersion is continuously, periodically or intermittently circulated between the reservoir where ultrasonic treatment takes place and the cathode compartment.

The ionic liquids suitable may comprise any of cations such as imidazolium cation, piperidinium cation, pyrrolidinium cation, pyridinum cation, ammonium cation and phosphonium cation and any of anions such as bis(trifluoromethansulfonyl)imide anion, bis(fluorosulfonyl)imide anion, tetrafluoroborate anion, hexafluorophosphate anion, dicyanamide anion and a halogen anion (chloride, bromide or iodide). In preferred embodiments the ionic liquid may be N-methyl-N-propylpiperidinium bis(trifluoromethansulfonyl)imide (PP13TFSI) or N,N-Diethyl-N-Methyl-N-(2-methoxyethyl)ammonium bis(trifluoromethansulfonyl)imide (DEMETFSI).

Ionic liquids may be considered as oil-like materials which are generally immiscible in water. However, ionic liquids are able to dissolve a certain volume of water and selected ionic liquids may be miscible in a water media. Such a biphase environment provides many advantages for a metal-air battery electrolyte.

For non-aqueous system, water content is controlled originally in the ionic liquid, such that the electrochemical performance is not adversely affected by the moisture content. Basically, an essentially moisture-saturated ionic liquid phase can be maintained.

The working potential of a cathode in the miscible electrolyte of the saturated ionic liquid is higher than the working potential of a cathode in a conventional non-aqueous electrolyte exposed to moisture, such as, for example, an environment at a relative humidity of 50%.

For aqueous system, water only functions as an active material and does not act as a solvent. So, the electrolyte is not dried up. Water as active material may be supplied from outside the battery with humidity control.

Also, the alkaline discharge product is retained as a solid precipitate, resulting in less corrosion and steady working potential without any significant change of pH in the solution.

Thus, an ionic liquid with a high tolerance and stability to oxygen radicals is used and a hygroscopic ionic liquid which will absorb moisture from the incoming air and tolerate an emulsion or dispersion is advantageous. Further, one of skill in the art will recognize that an ionic liquid that is reactive to water would not be suitable as an electrolyte component of the present invention. Additionally, the electrolyte system of the present invention allows for exposure of the cathode to air as an oxygen source because the ionic liquid is not volatile and therefore electrolyte loss during the battery operation is not a problem.

The metal ion conductive membrane may be constructed of a polymer, a ceramic or a composite thereof. To reduce any detrimental effect of gas on performance of the anode, an effective membrane will be fully impermeable or substantially ompermeable to gas, thus preventing gas admitted to the cathode compartment from entrance to the anode compartment. A preferable partition may be a dense ceramic membrane. For example, the partition may be a lithium-ion conducting ceramic plate such as Li—La—Ti—O based perovskite, a Li—Al—Ti—P—O based NASICON, a Li—

La—Zr—O based garnet, a Li—P—S based solid electrolyte and a Li—Ge—P—S based solid electrolyte.

The metal of the anode may comprise any of a transition metal, an alkali metal and an alkaline earth metal.

The cathode may be of a porous unit construction and may further comprise an oxidation reduction catalyst, a conductive material and a binder. The cathode may be constructed by mixing the redox catalyst, conductive material and optionally the binder and applying the mixture to a current collector of appropriate shape. The oxidation reduction catalyst may be any material which promotes the $O_2$ redox reaction.

Examples of an $O_2$ redox catalyst may include but are not limited to a transition metal oxide which may include rare earth elements, for example, manganese oxides (e.g. $MnO_2$), ruthenium oxides (e.g. $RuO_2$), cobalt oxides (e.g. $Co_3O_4$), perovskites in a form of $ABO_3$ (wherein A is La, Sr, Ba, etc., B is Co, Mn, Fe, Ni, etc.) and pyrochlores in a form of $A_2B_2O_7$ (wherein A is Pb, Bi, etc., and B is Ru, etc.) or any combination thereof. A precious metal such as Pt, Au, Pd, Rh, Ag or any combination thereof may be present in the catalyst. Also, an organic molecule such as a phthalocyanine, polyphirin, metal organic framework, nitroxyradical, thiafulvalene or any combination thereof may be used as the catalyst. The cathode may contain an electrically-conductive material which is chemically stable in the potential window of use of the cell.

Preferably the conductive material is porous and has a large specific surface area to provide high output. An example of such material may include but is not limited to a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a current collector by conventionally known methods. Any suitable current collector may be employed. Preferred current collectors may be any of carbon, stainless steel, nickel, aluminum and copper. In order to assist diffusion of the air, it may be preferable that the collector is a porous body, such as mesh. In certain embodiments the current collector may comprise a protective coating of an oxidation-resistant metal or alloy to protect the collector from oxidation.

Supporting electrolyte salts are those salts which are conventionally known and are selected to be compatible and consistent with the anode active material. For example with a lithium anode, the lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$, $LiN(C_2F_5SO_2)_2$ and $LiC_4BO_8$.

In an aspect of the lithium-air battery the ionic liquid may be N-methyl-N-propylpiperidinium bis(trifluoromethansulfonyl)imide (PP13TFSI) or N,N-Diethyl-N-Methyl-N-(2-methoxyethyl)ammonium bis(trifluoromethansulfonyl)imide (DEMETFSI).

In a further aspect of the lithium-air battery, a salt that enhances the performance of the ionic liquid may be added to the cathode compartment. Such salt must be soluble in the ionic liquid and may serve to stabilize reduced $O_2$ radicals obtained at the cathode without forming solid precipitates which would congest the cathode matrix. Suitable salts that may be added to the cathode compartment include salts of organic cations compatible with an ionic liquid. Examples of such salts include tetraalkyl ammonium salts, imidazolium salts, pyridinium salts, piperidinium salts and pyrrolidinium salts. In one embodiment, an additive salt may be tetrabutyl ammonium (TBA) bis(trifluoromethansulfonyl)imide (TFSI).

The anode compartment may be referenced as the anolyte while the system of the cathode compartment may be referenced as the catholyte.

Nonaqueous solvents suitable for the anode compartment include cyclic carbonates, chain carbonates, cyclic esters, cyclic ethers, chain ethers, nitriles, sulfoxides or any combination thereof. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethyleneglycol dimethyl ether. An example of a nitrile is acetonitrile. An example of a sulfoxide is dimethylsulfoxide. In some preferred embodiments the solvent may be a mixed solvent system such as ethylene carbonate and diethyl carbonate or an ionic liquid.

Further the lithium electrolyte salt is selected from $LiPF_6$, $LiClO_4$, $LiAsF_6$, $LiBF_4$, $LiN(CF_3SO_2)_2$, $Li(CF_3SO_3)$, $LiN(C_2F_5SO_2)_2$ and $LiC_4BO_8$.

In further embodiments the present invention provides metal-air batteries that are capable to provide sufficient energy output to be a power source for a vehicle wherein the vehicle includes an automobile, truck van, bus, golf cart and other utility forms of transportation.

In additional embodiments, the present invention includes a vehicle as defined above which contains a metal-air battery according to the invention.

Having generally described this invention, a further understanding can be obtained by reference to certain specific examples which are provided herein for purposes of illustration only and are not intended to be limiting unless otherwise specified.

EXAMPLES

Example 1

Sonicated biphase electrolyte solution, wherein only the ionic liquid part (bottom layer) is extracted after ultrasonic bath sonication of the mixture of N-methyl-N-propylpiperidinium bis(trifluoromethansulfonyl)imide (PP13TFSI) and distilled water with 1:1 in volume, which are exposed to ambient air with relative humidity 41%.

Comparative Example 1

Biphase electrolyte solution, wherein only the ionic liquid part (bottom layer) is extracted after mixing of PP13TFSI and distilled water with 1:1 in volume, which are exposed to ambient air with relative humidity 21%.

Comparative Example 2

Exposed electrolyte solution, wherein PP13TFSI is exposed to ambient air with relative humidity 47%.

FIG. 1 shows a schematic structure of an electrochemical cell for cyclic voltammetry analysis of the electrolyte systems.

Test Condition
Working electrode: Glassy carbon
Counter electrode: Pt wire
Reference electrode: Ag wire in a reference solution of 0.01 M AgNO$_3$ and 0.1 M tetrabutylammonium perchlorate (TBAP) in acetonitrile (ACN)

Figure 2:
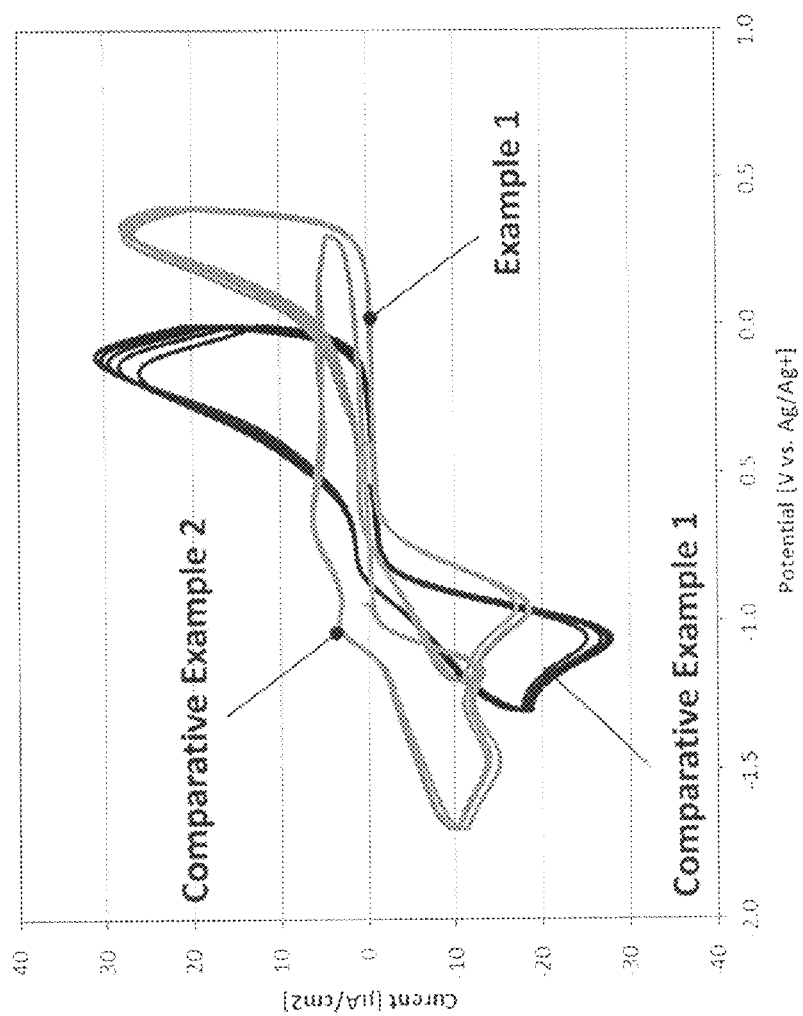
FIG. 2 shows the cyclic voltammograms obtained on the glassy carbon using the electrolytes of Example 1 and Comparative examples 1 and 2.

FIG. 2 shows the cyclic voltammograms obtained on the glassy carbon using the electrolytes of Example 1 and Comparative examples 1 and 2. The scan rate was 50 mV/sec and the applied temperature was room temperature.

Example 1 shows higher working potential with higher reversibility than Comparative Examples 1 and 2, resulting in the higher energy density as a rechargeable battery.

Example 2

Sonicated biphase electrolyte solution, wherein only the ionic liquid part (bottom layer) is extracted after ultrasonic bath sonication of the mixture of N,N-dimethyl-N-methyl-(2-methoxyethyl)ammonium bis(trifluoromethansulfonyl)imide (DEMETFSI) and distilled water with 1:1 in volume, which are exposed to ambient air with relative humidity 41%.

Comparative Example 3

Exposed electrolyte solution, wherein DEMETFSI is exposed to ambient air with relative humidity 41%.

Figure 3:
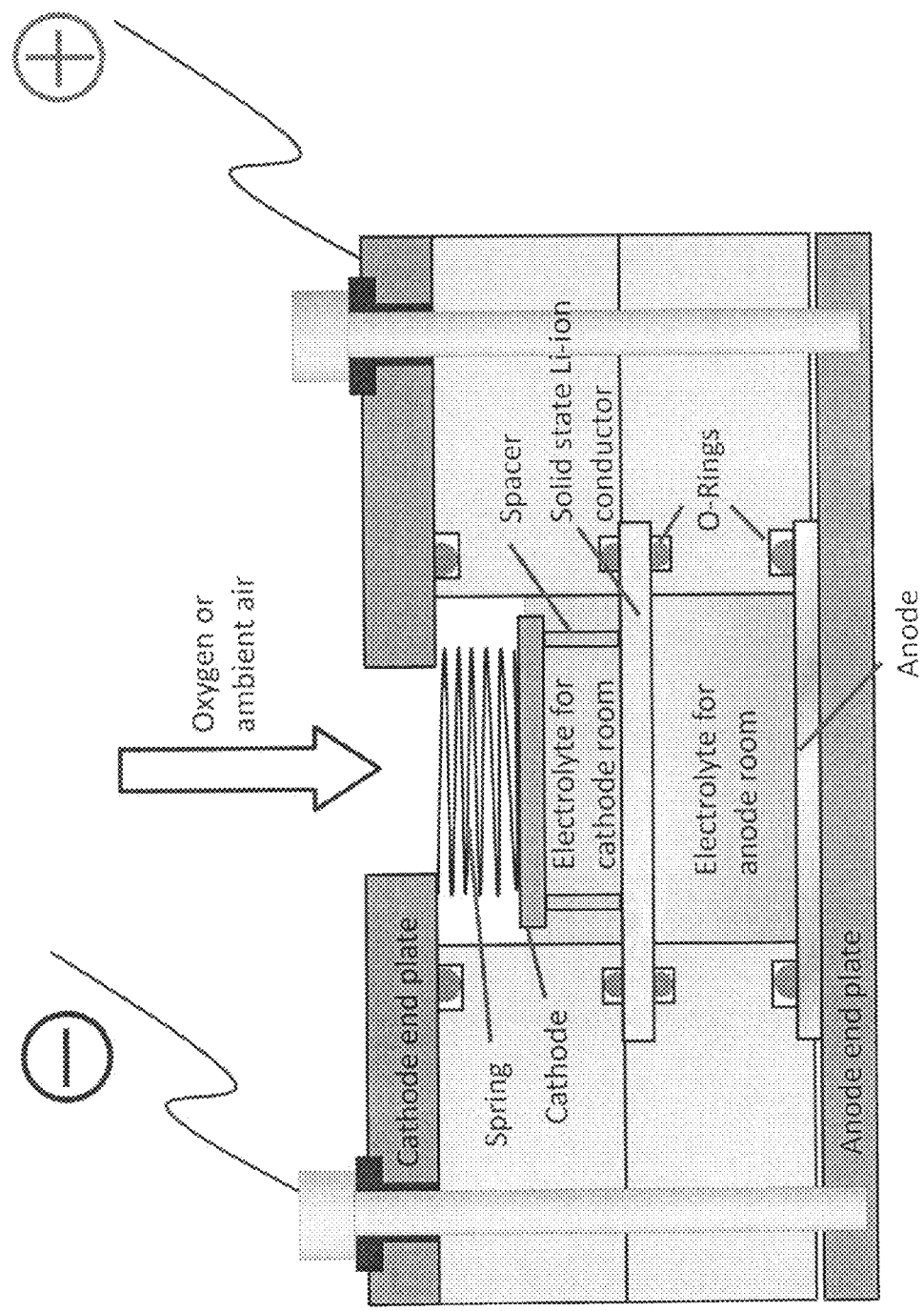
FIG. 3 shows a schematic structure of a Li-air battery for discharge measurement of the electrolyte systems.

FIG. 3 shows a schematic structure of a Li-air battery used for discharge measurement of the electrolyte systems.

Test Condition
Anode: Li metal
Electrolyte for anode (anloyte): 1M LiTFSI (lithium bis(trifluoromethansulfonyl)imide)/PC (propylene carbonate)
Separator: Li ion conducting ceramic membrane (made by OHARA, LIC-GC)
Electrolyte for cathode (catholyte): tested samples (example 2 and comparative example 3)
Cathode: carbon paper (made by Toray, TGP-H-120)
Gas: Ambient air (Relative humidity 41%)

Figure 4:
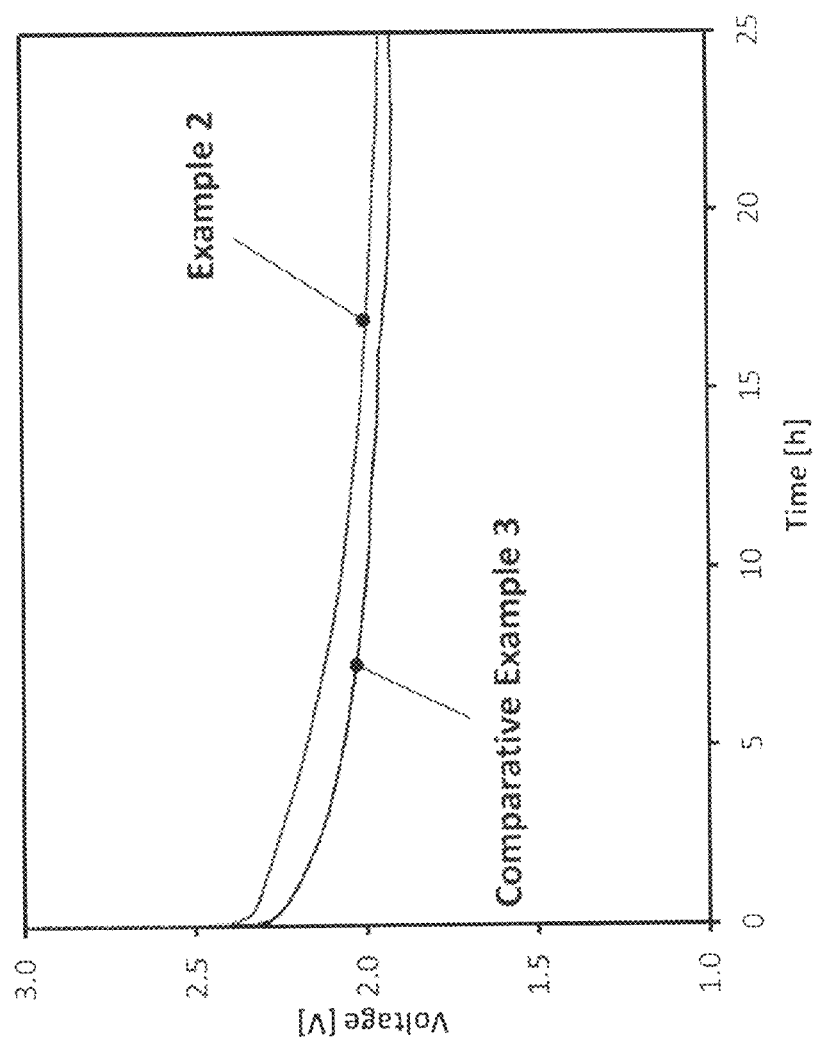
FIG. 4 shows the discharge profiles of the Li-air batteries obtained with Example 2 and Comparative example 3 as cathode electrolytes.

FIG. 4 shows the discharge profiles of the Li-air batteries obtained with Example 2 and Comparative example 3 as cathode electrolytes. As shown, Example 2 showed higher working potential than Comparative Example 3, resulting in the higher energy density as a battery.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A metal-air battery, comprising:
an anode compartment;
a cathode compartment supplied with an O$_2$ source; and
a metal ion conductive membrane separating the anode compartment from the cathode compartment; wherein
the anode compartment comprises an anode having a transition metal, alkali metal or alkaline earth metal as an active component, and
the cathode compartment comprises an air electrode and a two phase electrolyte system comprising an aqueous phase and an ionic liquid phase, wherein the amount of water in the cathode compartment exceeds the water solubility amount of the ionic liquid, and
the two phase electrolyte system is in a form of an emulsion or a dispersion.

2. The metal-air battery of claim 1, wherein the ionic liquid phase comprises an ionic liquid having a cation selected from the group consisting of an imidazolium cation, a piperidinium cation, a pyrrolidinium cation, a pyridinium cation, an ammonium cation and a phosphonium cation and an anion selected from the group consisting of a bis(trifluoromethansulfonyl)imide anion, a bis(fluorosulfonyl)imide anion, a tetrafluorohorate anion, a hexafluorophosphate anion, a dicyanamide anion, a chloride anion, a bromide anion and an iodide anion.

3. The metal-air battery of claim 1, wherein the ionic liquid further comprises a salt selected from the group consisting of a tetraalkyl ammonium salt, an imidazolium salt, a pyridinium salt, a pyrrolidinium salt and a piperidinium salt.

4. The metal-air battery of claim 1, wherein the metal ion conductive membrane separating the anode compartment from the cathode compartment is a polymer, a ceramic material or a composite thereof.

5. The metal-air battery of claim 1, wherein the emulsion or dispersion of the aqueous phase in the ionic liquid phase is obtained by sonication of the two phase system comprising water and the ionic liquid.

6. The metal-air battery of claim 5, further comprising an ultra-sonication unit either directly in contact with the cathode compartment or as an associated device with the metal-air battery which supplies the sonicated emulsion or dispersion to the cathode compartment.

7. A lithium-air battery, comprising:
an anode compartment;
a cathode compartment supplied with an O$_2$ source; and
a lithium ion conductive membrane separating the anode compartment from the cathode compartment; wherein
the anode compartment comprises an anode having lithium metal or a lithium alloy as an active component and a lithium electrolyte salt,
the cathode compartment comprises an air electrode and a two phase electrolyte system comprising an aqueous phase and an ionic liquid phase, wherein the amount of water in the cathode compartment exceeds the water solubility amount of the ionic liquid, and
the two phase electrolyte system is in a form of an emulsion or a dispersion.

8. The lithium-air battery of claim 7, wherein the emulsion or dispersion of the aqueous phase in the ionic liquid phase is obtained by sonication of a two phase system comprising water and the ionic liquid.

9. The lithium-air battery of claim 8, further comprising an ultra-sonication unit either directly in contact with the cathode compartment or as an associated device with e metal-air battery which supplies the sonicated emulsion or dispersion to the cathode compartment.

10. The lithium-air battery of claim 7, wherein the lithium ion conductive membrane separating the anode compartment from the cathode compartment is a polymer, a ceramic material or a composite thereof.

11. The lithium air battery of claim 10, wherein
the lithium ion conductive membrane comprises a ceramic material and the ceramic material is a dense ceramic membrane.

12. The lithium air battery of claim 11, wherein the dense ceramic membrane comprises one selected from the group consisting of a Li—La—Ti—O based perovskite, a Li—Al—Ti—P—O based NASICON, a Li—La—Zr—O based garnet, a Li—P—S based solid electrolyte and a Li—Ge—P—S based solid electrolyte.

13. he lithium-air battery of claim 7, wherein the anode compartment further comprises at least one nonaqueous solvent selected from the group consisting of a cyclic carbonate, a chain carbonate, a cyclic ester, a cyclic ether, a chain ether, a nitrile, a sulfoxide and an ionic liquid.

14. The lithium-air battery of claim 7, wherein the anode compartment further comprises a salt selected from the group consisting of $LiPF_6$, $LiClO_4$, $LiAsF_6$, $LiBF_4$, $LiN(CF_3SO_2)_2$, $Li(CF_3SO_3)$, $LiN(C_2F_5SO_2)_2$ and $LiC_4BO_8$.

15. The lithium-air battery of claim 7, wherein the ionic liquid phase comprises N-methyl-N-propylpiperidinium bis (trifluoromethansulfonyl)imide (PP13TFSI) or N,N-Di-ethyl-N-Methyl-N-(2-methoxyethyl)ammonium bis(trifluoromethansulfonyl)imide (DEMETFSI).

16. The lithium air battery of claim 7, wherein the air electrode comprises at least one of a redox catalyst and a conductive material.

17. The lithium air battery of claim 7, wherein the air electrode comprises a redox catalyst and the redox catalyst is at least one selected from the group consisting of a transition metal oxide, a perovskite and a pyrochlore.

18. The lithium air battery of claim 7, wherein the air electrode further comprises a precious metal catalyst.

19. The lithium air battery of claim 7 wherein the air electrode further comprises an organic molecule selected from the group consisting of a phthalocyanine, a polyphirin, a metal organic framework, a nitroxyradical and a thiafulvalene.

20. The lithium air battery of claim 7, wherein the air electrode comprises a conductive material and the conductive material is selected from the group consisting of
Ketjen black, acetylene black, vapor grown carbon fiber, graphene, natural graphite, artificial graphite, activated carbon, a metal fiber, a metal powder and an organic conductive material.

21. A vehicle comprising the metal-air battery of claim 1.

22. A vehicle comprising the lithium-air battery of claim 7.

* * * * *